March 14, 1961 W. M. ALLISON 2,974,396
ELECTRICAL CAPACITORS
Filed Jan. 18, 1957

INVENTOR.
WILLIAM M. ALLISON
BY Connolly and Hutz
HIS ATTORNEYS

United States Patent Office 2,974,396
Patented Mar. 14, 1961

2,974,396

ELECTRICAL CAPACITORS

William M. Allison, Williamstown, Mass., assignor to Sprague Electric Company, North Adams, Mass., a corporation of Massachusetts Filed Jan. 18, 1957, Ser. No. 635,015

5 Claims. (Cl. 29—25.42)

The present invention relates to wound capacitors. This application is in part a continuation of application Serial No. 292,685, filed June 10, 1952, now U.S. Letters Patent 2,785,351, issued March 12, 1957.

As set forth in the prior application, this invention has among its objects the provision of novel wound capacitors which are simple to manufacture and have desirable operational and structural features.

The above as well as additional objects of the present invention will be more clearly understood from the following description of several of its exemplifications, reference being made to the accompanying drawings wherein:

Fig. 1 diagrammatically illustrates the winding of capacitors pursuant to the present invention;

According to the present invention, the various parts of a capacitor are helically wound around a core in much the same manner as a continuous paper strip is wound to form a drinking straw. The various necessary strips are applied on top of one another until all of the elements of the capacitor are present. The wound assembly is removed from the core and then flattened to make a completed unit. The flattened unit can be used as is, or wound into a cylinder or stacked or bent to a desired configuration.

Figure 1:
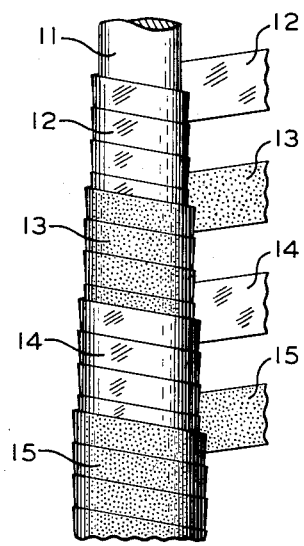

Referring now to the drawings, Fig. 1 shows one way of practicing the invention by first helically winding a metallic foil 12 about a central core 11 in an endless fashion. Next, a dielectric ribbon 13 is applied on top of this foil in the same manner of winding. A second electrode 14 is then applied upon the dielectric 13 in the helical manner, and this, in turn, is covered by a fourth winding of a second dielectric ribbon 15. In all of these cases the direction of winding is substantially immaterial and the various layers can be applied by winding in opposite directions, if desired.

Once the various foils and dielectrics have been positioned, the core 11 is removed and the resulting tube is pressed flat and can be provided with electrical connections.

Figure 2:
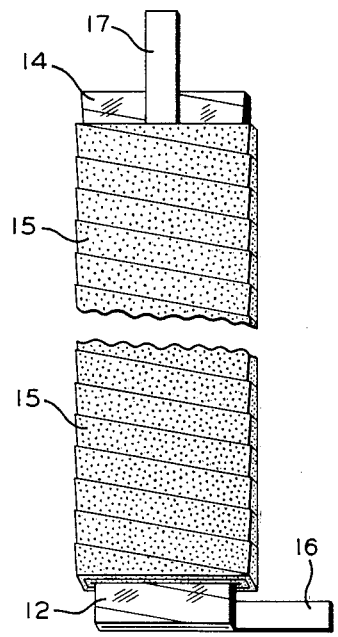
Fig. 2 is a partially perspective view of a flattened capacitor embodying the present invention.

One manner of providing terminals is shown in Fig. 2. Tabs 16 and 17 are attached as by welding, soldering or staking, to exposed portions of the electrode foils 12 and 14. Alternatively these exposed portions may be directly soldered to leads from circuit elements to which the capacitor is to be connected.

Other terminal arrangement modifications include the insertion of tab 16 within the electrode 12, in the place previously occupied by the core 11, or the unwinding of the last turn or two of the respective electrodes so that these unwound ends can be used as connectors. Although the terminals are provided at opposite ends of the unit in Fig. 2, they can be both located at or adjacent the same end, or the tab 17 can even be connected to any intermediate portion of the length.

The outer layer of dielectric 15 can be removed or entirely omitted to permit the connection of tab 17 in any location.

A feature of the present invention is the small thickness with which the flattened capacitors can be made. The overall thickness should be no more than 40 mils, and with the standard types of foil and paper, can be made as thin as 2 mils or even less. The foils and dielectric can, for example, each be ¼ mil thick.

The flattened assembly is accordingly mountable in or on the chassis of an electronic circuit assembly in a very flexible manner. For example, it can be laid out flat directly against the chassis so that it does not take up any appreciable space. Alternatively it can be bent into any desired shape so as to fit into place between the components of even a very crowded chassis. For these purposes it is generally preferred that the central flattened electrode be not more than 10 mils thick, the dielectric sleeve around it be such as to increase the thickness to not more than about 30 mils, and the outer electrode also contribute not more than about 10 mils of added thickness. The outer dielectric layer, if used, is preferably of a protective material such as a resin that is applied by winding or dipping, to help seal the interior of the unit from moisture and other adverse influences. If paper is used as the outer layer, it is desirably of the abrasion-resistant type such as vulcanized fiber or glassine, although any kind of paper can be used very satisfactorily if the unit is impregnated, as with a wax or resin.

Figure 3:
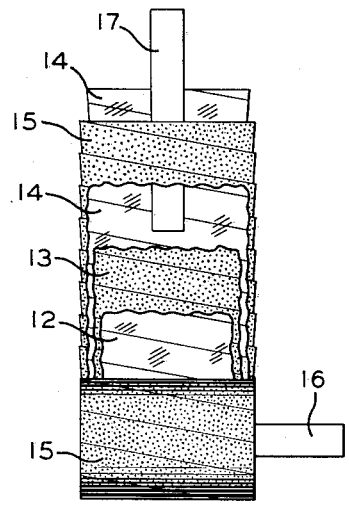
Fig. 3 is a plan view, with parts broken away, of a capacitor such as that of Fig. 2, partially rolled up; and, Fig. 4 is a fragmentary partly unrolled view of a modified embodiment of this invention, which utilizes metallized dielectric strip material.

The flattened assembly can also be rolled up, as indicated in Fig. 3, to make a convolute winding of more-or-less conventional shape so that it can be used like standard prior art capacitors. This construction takes advantage of the absence of the very sharp foil edges of the prior art units, where the interelectrode field strength is highly concentrated and breakdown most frequently occurs. The construction of Fig. 3 can have the outer dielectric ribbon 12 omitted, and the ends of convolutely wound product sprayed with metal to provide a terminal attaching site and to also mechanically reenforce the product as well as help hold the turns in wound-up condition. In such a modified construction the central electrode should project out from the outer end of the winding so as to provide a connection site.

The capacitors of the present invention can be fitted with a plurality of leads to either or both electrodes. For instance, leads at each end of the inner electrode can be connected to the same circuit element to reduce the inductance of the capacitor. In general, any metal can be used for electrode material, but copper, lead, tin, zinc or iron solder more readily with the standard tin-lead solders.

Another feature of the present invention is that using only a single interelectrode dielectric ribbon, the units can be continuously wound so as to provide a plurality of dielectric thicknesses between the electrodes. Three, four, or even five or more thicknesses can be so provided by adjusting the overlap between the individual turns of this dielectric. No pauses are needed during the winding to insert separate electrode plates as in the conventional plate-type winding. Details of the plate-type winding are given in the copending Doughty applications, S.N. 531,-952 filed September 1, 1955 and later abandoned; and S.N. 635,014 filed concurrently herewith and later issued as U.S. Letters Patent 2,846,627 on August 5, 1958.

The flattened units of Fig. 2 can also be made in continuous lengths as by winding layers on a core that is continually being withdrawn. The winding should be made a little loose for this purpose so as to permit slippage over the withdrawing core. Continuous lengths can also be used for maintenance purposes and cut by a repair man, for example, to a length that provides the desired capacitance. After the cutting to length, each cut end can have one or both of the electrodes at that end unpeeled slightly so as to space the cut electrode margins from each other.

The interelectrode dielectric can be paper or resin, or any desired material, but where thermoplastic resins are used for this purpose, the assembly, preferably after flattening, can be heat treated to cause the partially overlapping layers to fuse together somewhat, and thereby improve the electrical characteristics of the dielectric.

A still further feature of the present invention is the fact that the helical type of windings make a much more readily impregnatable construction. The impregnant apparently finds its way much better through the helical passageway provided between layers by reason of the stepped arrangement of the turns. Any desired impregnants can be used, including chlorinated naphthalene, chlorinated diphenyl, chlorinated mineral oil, castor oil, polybutadiene, or even resins that become solidified, such as those described in the Ross copending application, Serial No. 455,116, filed September 10, 1954 and issued June 30, 1959 as U.S. 2,892,972.

Figure 4:
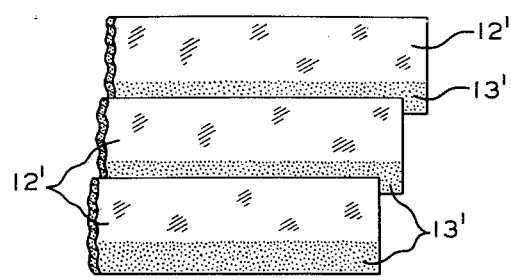

Instead of using separate layers of foils and dielectric strips my helically wound capacitor may be constructed from one or more overlying layers of metallized dielectric strip material. The metallization can be accomplished by vacuum distillation of the metal to provide the standard type of exceedingly thin metal coating well known in the metallized capacitor art. Fig. 4 shows dielectric strip material 13' which has received a metallized coating 12' over a portion of its faces. The extent of metallization of strip 13' may be varied depending upon the amount of overlap that is to be employed in winding the strip on core 11. It being important only that an unmetallized margin be provided to prevent shorting of the metallized surfaces on opposite faces of strip 12' in the rolling of a single strip helically wound unit. Strip 13' with its metal coating 12' may be utilized in any of the above-disclosed embodiments of my helically wound capacitor.

The capacitors of the present invention can also have two or more different types of interelectrode dielectric windings wound over each other to provide desirable combinations, such as paper and polyethylene terephthalate. Furthermore, the capacitors can have three or more electrodes so that each assembly is a multiple capacitor. On the other hand, one or more of the electrodes can be of the floating or disconnected type merely used to adjust the field intensity gradation between two other electrodes.

The central electrode can also be made of a pre-formed tube, such as a continuous resin tube, the outer surface of which is metallized. The outer layers can then be wrapped around it either before or after the central tube is flattened. If the free margin effects of a non-folded central foil are not too objectionable, such a foil can be used as the central electrode in a similar manner. It is preferred that such foils be at least about 2 mils thick to minimize the difficulties in winding the other layers about it.

Many modifications and variations of the present invention are possible in the light of the above teachings. It is, therefore, to be understood that within the scope of the appended claims, the invention may be practiced otherwise than as specifically described.

What is claimed is:

1. A process for producing a capacitor which process comprises the step of flattening a group of correspondingly helically elongated electrically conductive and non-conductive layers including two conductive layers separated from each other by a non-conductive layer and overlapping each other along substantially the entire helix, providing a terminal in contact with each of the two conductive layers, and rolling the flattened group into a compact winding.

2. A process for producing an electrostatic capacitor assembly of electrodes that are in capacitive relationship and are separated by a dielectric layer, which process comprises helically winding a ribbon of electrode material about a core in partially overlapping relationship to produce a continuous electrode sleeve, then helically winding a ribbon of dielectric material over the electrode sleeve in partially overlaping relationship to provide a continuous dielectric layer, then applying a second electrode over the dielectric layer, then removing the core, then flattening the assembly, and then attaching a terminal tab to each of said ribbon of electrode material and said second electrode.

3. The process of claim 2 in which the core is being withdrawn from the assembly during production of the assembly.

4. The process of claim 2 in which the second electrode is applied in the form of a helically wound ribbon of electrode material.

5. The process of claim 2 in which the flattened assembly is rolled into a compact winding.

References Cited in the file of this patent

UNITED STATES PATENTS

| | | |
|---|---|---|
| 2,232,320 | Georgiev | Feb. 18, 1941 |
| 2,387,759 | Jarvis | Oct. 30, 1945 |
| 2,399,798 | Grouse | May 7, 1946 |
| 2,470,826 | McMahon | May 24, 1949 |
| 2,691,698 | Schmidt | Oct. 12, 1954 |
| 2,785,351 | Allison | Mar. 12, 1957 |